United States Patent
Kelly et al.

[19]

[11] Patent Number: 6,126,538
[45] Date of Patent: Oct. 3, 2000

[54] POWERED HINGELESS VENTILATOR

[75] Inventors: Timothy A. Kelly; Randy L. Pratt, both of Salem, Va.

[73] Assignee: Salem Vent International, Inc., Salem, Va.

[21] Appl. No.: 09/322,753

[22] Filed: May 28, 1999

[51] Int. Cl.[7] ...................................................... B60H 1/30
[52] U.S. Cl. ........................... 454/143; 49/340; 454/151
[58] Field of Search .................................... 454/138, 143, 454/145, 146, 147, 148, 151, 162, 164, 333; 49/340

[56] References Cited

U.S. PATENT DOCUMENTS

| | | |
|---|---|---|
| 3,046,865 | 7/1962 | Kelly . |
| 3,102,464 | 9/1963 | Kelly et al. . |
| 3,358,576 | 12/1967 | Kelly et al. . |
| 3,375,772 | 4/1968 | Kelly et al. . |
| 3,760,707 | 9/1973 | Kelly . |
| 3,839,950 | 10/1974 | Kelly et al. . |
| 4,452,129 | 6/1984 | Kelley et al. . |
| 4,519,645 | 5/1985 | Kelly et al. . |
| 4,522,115 | 6/1985 | Kelly et al. . |
| 5,020,425 | 6/1991 | Kelly . |
| 5,766,068 | 6/1998 | Kelly . |

*Primary Examiner*—Harold Joyce
*Attorney, Agent, or Firm*—Dority & Manning

[57] ABSTRACT

A remotely controlled powered hingeless ventilator has a cover configured on a frame on a side thereof opposite from a tension rod. The cover is variably positionable between a closed position and a fully open position relative to the frame. An actuating member connected to an underside of the cover extends through a slot in a plate member across the ventilation opening and includes an arcuate guide slot defined therein. The tension rod is disposed through this guide slot. A motor is mounted on the frame and is connectable to a power source. The motor includes a rotatable drive arm connected to the actuating member. The drive arm has a generally arcuate shape and is connected to the actuating member so that an opening and closing force is exerted by the drive arm to the actuating member along a line of force corresponding generally to an extension of the arcuate guide slot.

13 Claims, 7 Drawing Sheets

POWERED HINGELESS VENTILATOR

BACKGROUND OF THE INVENTION

The present invention relates generally to hingeless ventilators used for ventilating enclosed air spaces.

Hingeless ventilators from Salem Vent International, Inc. of Salem, Virginia, are well known in the art, particularly in the trucking and vehicle industry. Exemplary hingeless ventilators are described in U.S. Pat. Nos. 3,375,772; 3,760,707; 3,839,950; 4,452,129; and 5,766,068. Certain types of these hingeless ventilators are known as "two-way" ventilators in that the cover or closure member can be opened in one direction to draw air into the enclosed space, or opened in the opposite direction to exhaust air from the enclosed space. Other embodiments of the hingeless ventilator are known as "one-way" ventilators in that the closure or cover member can only be opened in one direction.

The hingeless ventilators have found wide applications in various industries, particularly the trucking and RV industry wherein the ventilators are used to ventilate enclosed cab or vehicle spaces, principally because of their ability to seal reliably with relatively simple mechanical structure. However, with such conventional hingeless ventilators, the operator had to manually open and close the cover member and this restricted the location of the hingeless ventilators to heights and positions that were readily accessible. Particularly with recreational vehicles, such as campers and the like, and truck cab sleeping compartments, it may be desirable to locate the ventilators on the ceiling or roof panels of the compartment or other inaccessible locations. This has not been practical with the conventional devices since they were not remotely actuatable.

The present invention relates to an improved hingeless ventilator incorporating a motor drive unit that can be remotely actuated.

OBJECTS AND SUMMARY OF THE INVENTION

It is therefore a principal object of the present invention to provide a remotely controlled powered hingeless ventilator having any number of applications and uses, particularly in the vehicle industry, and more particularly in the trucking industry.

Additional objects and advantages of the invention will be set forth in part in the following description, or may be obvious from the description, or may be learned through practice of the invention.

In accordance with an embodiment of the invention, a remotely controlled powered hingeless ventilator is provided. The ventilator includes a frame that defines or bounds an opening. A plate member is configured with the frame across the opening and defines a plurality of air passages therethrough. For example, the plate member may be a perforated sheet metal member, screen, mesh member, or the like.

A tension rod is fixed to the frame and extends across the opening. A cover is configured on the frame on the side thereof opposite from the tension rod. The cover is variably positionable between a closed position and a fully opened position relative to the frame.

An actuating member is connected to the underside of the cover and extends through an opening in the plate member. The actuating member further includes an arcuate guide slot defined therein. The tension rod is maintained in a flexed condition and is disposed through the guide slot, and thereby supplies constant tension to the cover through the actuating member. The actuating member and guide slot are slidable relative to the tension rod as the cover is moved between the closed and opened positions.

In further accordance with an aspect of the invention, a motor drive unit is mounted on the frame. The motor is connectable to a power source for driving the motor. For example, the motor may be connected to any existing power system or source utilized by the vehicle, for example the vehicle's 12 volt DC system. Preferably, the motor is reversible so as to apply an opening and closing stroke to the actuating member. The motor further includes a rotatable drive arm that is connected to the actuating member at one end and connected to the drive shaft of the motor at the other end. This drive arm is preferably pivotally connected to the drive shaft so as to move in a plane generally perpendicular to the drive shaft. The drive arm may be pivotally connected to the actuating member to provide an opening or closing stroke thereto depending on the direction of rotation of the drive shaft.

In a preferred embodiment, the drive arm has a generally arcuate shape over at least a portion of its length and is connected to the actuating member so that the opening and closing force is exerted to the actuating member along a line or direction corresponding generally to the curve of the arcuate guide slot defined in the actuating member.

It is preferred that the motor be arranged on the frame so as to minimize outward protrusion of the motor relative to the frame. In this regard, the motor may comprise a drive shaft oriented longitudinally along the frame. In this embodiment, the drive arm is connected to the drive shaft so as to move in a plane perpendicular to the drive shaft. The drive arm may be connected to the drive shaft at a circumferential location thereon so as to maximize the opening and closing stroke of the drive arm. For example, the drive arm may be connected to the shaft at a circumferential side thereof opposite from the actuating member. In this manner, the drive arm moves the actuating member in a constant direction throughout the closing stroke and in the opposite constant direction throughout the opening stroke.

A motor bracket is preferably provided for the motor. The motor bracket is mounted to the frame and, preferably, the tension rod passes through a flange on the bracket. In this manner, any torque resulting from operation of the motor is distributed to the frame and the tension rod simultaneously thereby minimizing any tendency of the motor to twist or deform the frame.

The motor may be actuated or controlled by any remotely disposed controller. For example, in the embodiment wherein the ventilator is used as a vehicle compartment ventilator, the controller may be disposed on the dashboard or other control panel of the vehicle. In an alternative embodiment, the motor may be controlled by a switch directly configured with the motor and also at a remotely disposed controller. It should be appreciated by those skilled in the art that any number of modifications and variations may be made in the control function and apparatus for the motor.

The invention will be described in greater detail below through use of the figures.

DETAILED DESCRIPTION

Figure 1:
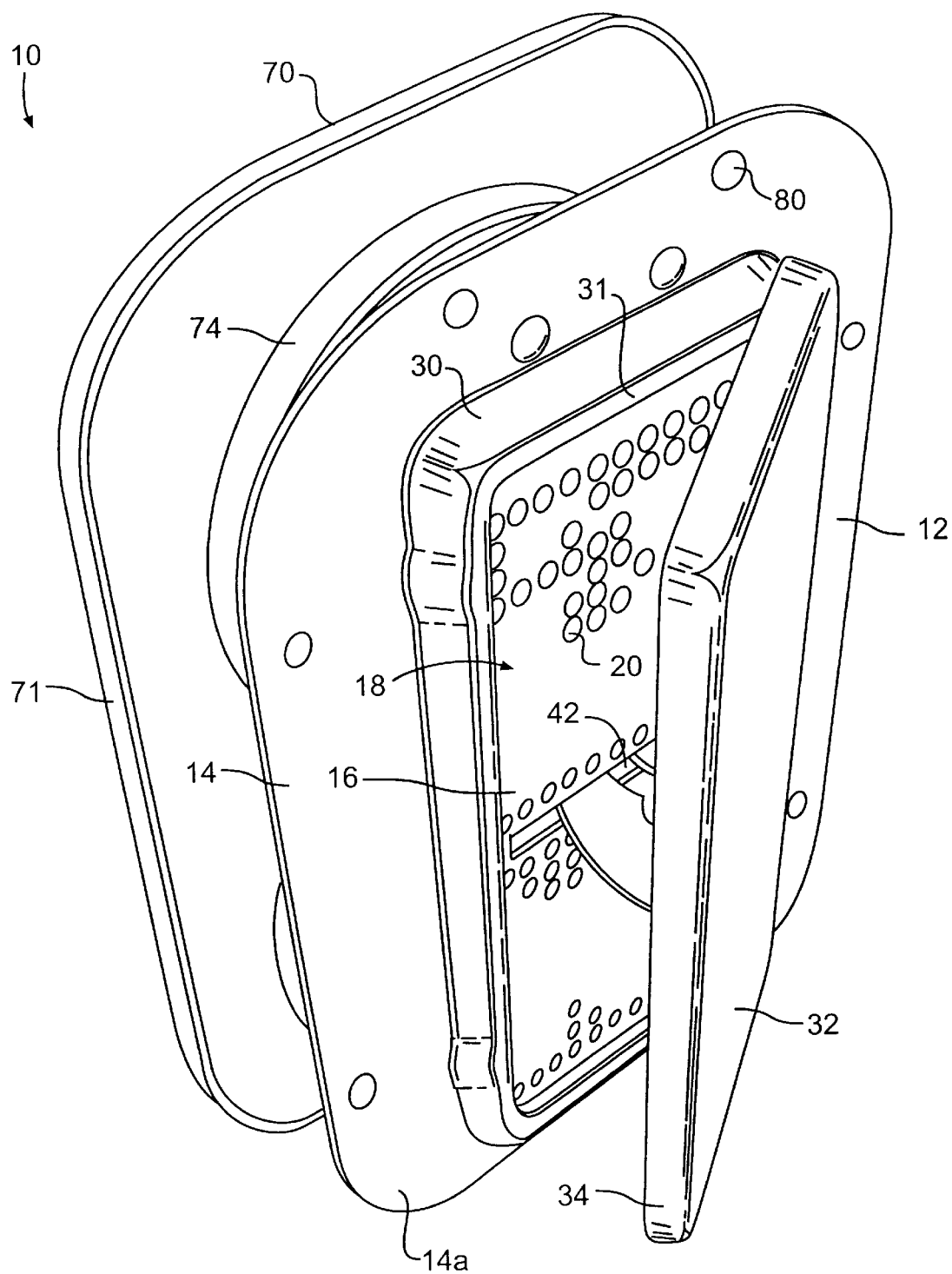
FIG. 1 is a perspective view of a vent assembly according to the present invention illustrated in its open position.

Reference will now be made in detail to the presently preferred embodiments of the invention, one or more examples of which are illustrated in the drawings. Each example is provided by way of explanation of the invention, and not meant as a limitation of the invention. For example, features illustrated or described as part of one embodiment can be used on another embodiment to yield a still further embodiment. It is intended that the present application include such modifications and variations as come within the scope of the appended claims and their equivalents.

Vent assembly 10 according to the invention is illustrated generally in the figures. Vent assembly 10 is not limited to any particular application and may be utilized wherever it is desired to provide a vent to a compartment or space. Ventilator 10 is particularly useful in the trucking and vehicle industry to provide a vent to compartments, cabs, and the like. Ventilator 10 is also particularly useful in the recreational vehicle and marine vessel industries. It should be appreciated that ventilator 10 according to the invention is not limited in any way by its intended use or application.

FIG. 1 illustrates vent assembly 10 with an associated cover assembly 70. Cover assembly 70 will be explained in greater detail below. Ventilator 10 includes a frame 12 that bounds or defines a vent opening, generally 18. A plate member 16 is configured with frame 12 across opening 18. Plate member 16 may be formed integral with frame 12, or may comprise a separate component placed across opening 18, for example a mesh or screen component. Plate member 16 defines a plurality of air passages 20 therethrough, illustrated in the figures as circular holes. However, it should be appreciated that air passages 20 may have any shape, pattern, or configuration. Frame 12 also includes a flange 14 provided for mounting ventilator 10 to any suitable wall or structure component. The ventilator may be mounted by any conventional means, such as rivets 80, adhesives, or the like.

Frame member 12 also defines a projecting lip 30, as particularly seen in FIG. 1. Lip 30 protrudes from a plane through flange 14 and includes a rim surface 31. Projecting lip 30 and rim surface 31 cooperate with a cover member 32 and gasket 36 to seal vent opening 18 and air passages 20, as described in greater detail below.

In one preferred embodiment of mounting ventilator 10, a hole is defined in the structural wall or panel that corresponds generally to the shape of projecting lip 30. The ventilator is mounted so that flange surface 14a as illustrated in FIG. 1 is attached to the interior surface of the respective structural panel. In this way, projecting lip 30 and cover 32 extend through the panel and are visible from outside the compartment. However, it should be appreciated that ventilator 10 can be mounted in alternative ways, including mounting flange 14 to the exterior of the compartment wall or panel.

Figure 3:
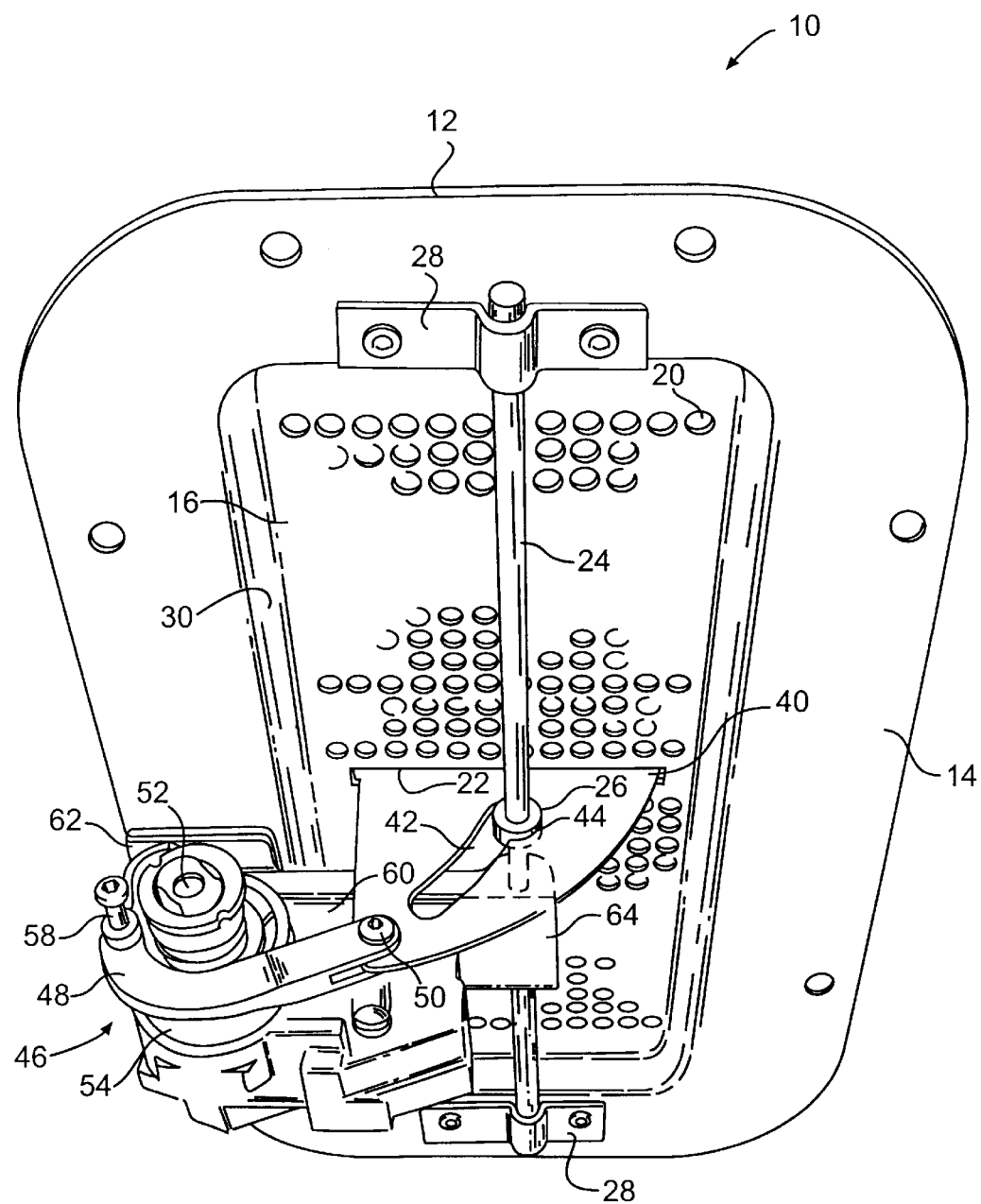
FIG. 3 is an interior perspective view of the vent assembly illustrated in FIG. 2 with the cover assembly removed.

Referring particularly to FIG. 3, ventilator 10 includes a tension rod 24 fixed to frame 12. For example, as illustrated in FIG. 3, rod retainers 28 hold the ends of tension rod 24 to frame 12. In this manner, tension rod 24 extends longitudinally across opening 18.

Figure 5A:
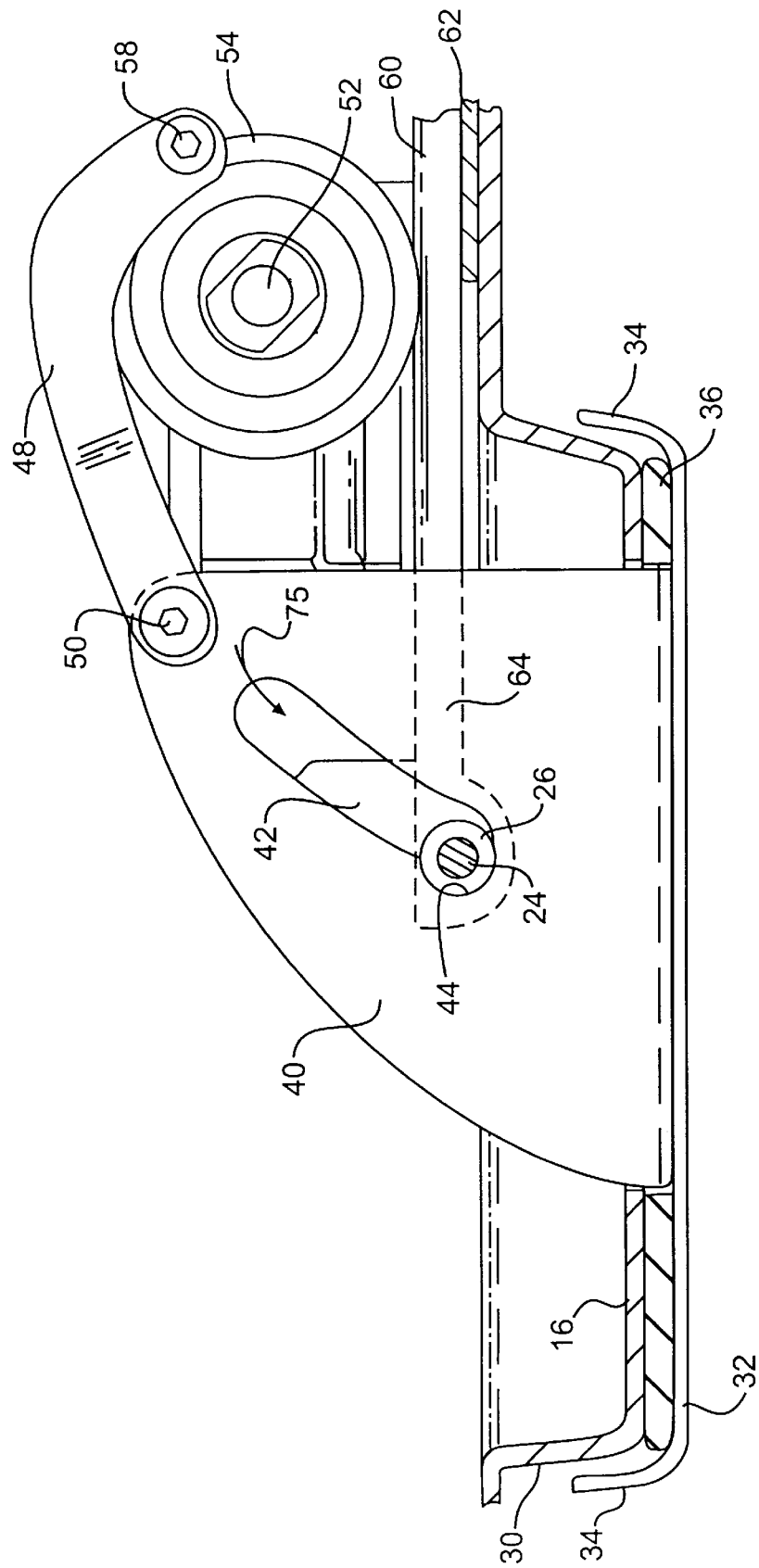
FIGS. 5a through 5c are sequential cross-sectional views of the motor assembly and actuating member particularly illustrating the vent cover being moved from its fully closed to fully open position.

Ventilator 10 includes a cover 32 configured on frame 12 on the side thereof opposite from tension rod 24. Cover 32 is variably positionable between a fully closed position, as illustrated in FIG. 5a, to a fully opened position as illustrated in FIG. 5c. In the closed position illustrated in FIG. 5a, cover 32 seals against projecting lip 30 and rim surface 31. A gasket or other type of sealing material 36 is provided on the underside of cover 32 for sealing purposes. Cover 32 includes a circumferential skirt 34 that overlaps projecting lip 30.

An actuating member 40 is connected to the underside of cover 32 and extends through a slot or opening 22 defined in plate member 16. Actuating member 40 may take on any manner of shape or configuration and the shape illustrated in the figures does not limit the invention in any way.

Actuating member 40 includes an arcuate guide slot 42 defined therein. Guide slot 42 includes a pocket 44 at an end thereof. Tension rod 24 passes through the guide slot 42 of actuating member 40 and a roller 26 is provided on tension rod 24 to aid in sliding movement of actuating member 40 relative to tension rod 24. The position of guide slot 42 relative to the longitudinal position of tension rod 24 ensures that rod 24 remains flexed, and thus provides tension to cover 32, in all positions of actuating member 40.

The elements of ventilator 10 described thus far are typical of a well known one-way hingeless ventilator from Salem Vent International, Inc. The operation of a one way ventilator is well known to those skilled in the art and is described, for example, in U.S. Pat. No. 3,375,772, which is incorporated herein for all purposes. Thus, a detailed description of the opening and closing operation of cover 32 relative to frame 12 is not necessary for an understanding of the present invention, and will only be described briefly herein.

Ventilator 10 is illustrated in FIGS. 5a and FIG. 3 in the closed position wherein cover 32 is sealed against projecting lip 30 of frame 12. Tension rod 24 is bowed by guide slot 42 between its ends held in rod retainers 28, and thus supplies a constant tension force to actuating member 40. In the closed position of cover 32, roller 26 resides in a pocket 44 defined at the end of guide slot 42 and the force applied by tension rod 24 is substantially entirely an inward force that holds cover 32 tightly against projecting lip 30 of frame 12.

Figure 5B:
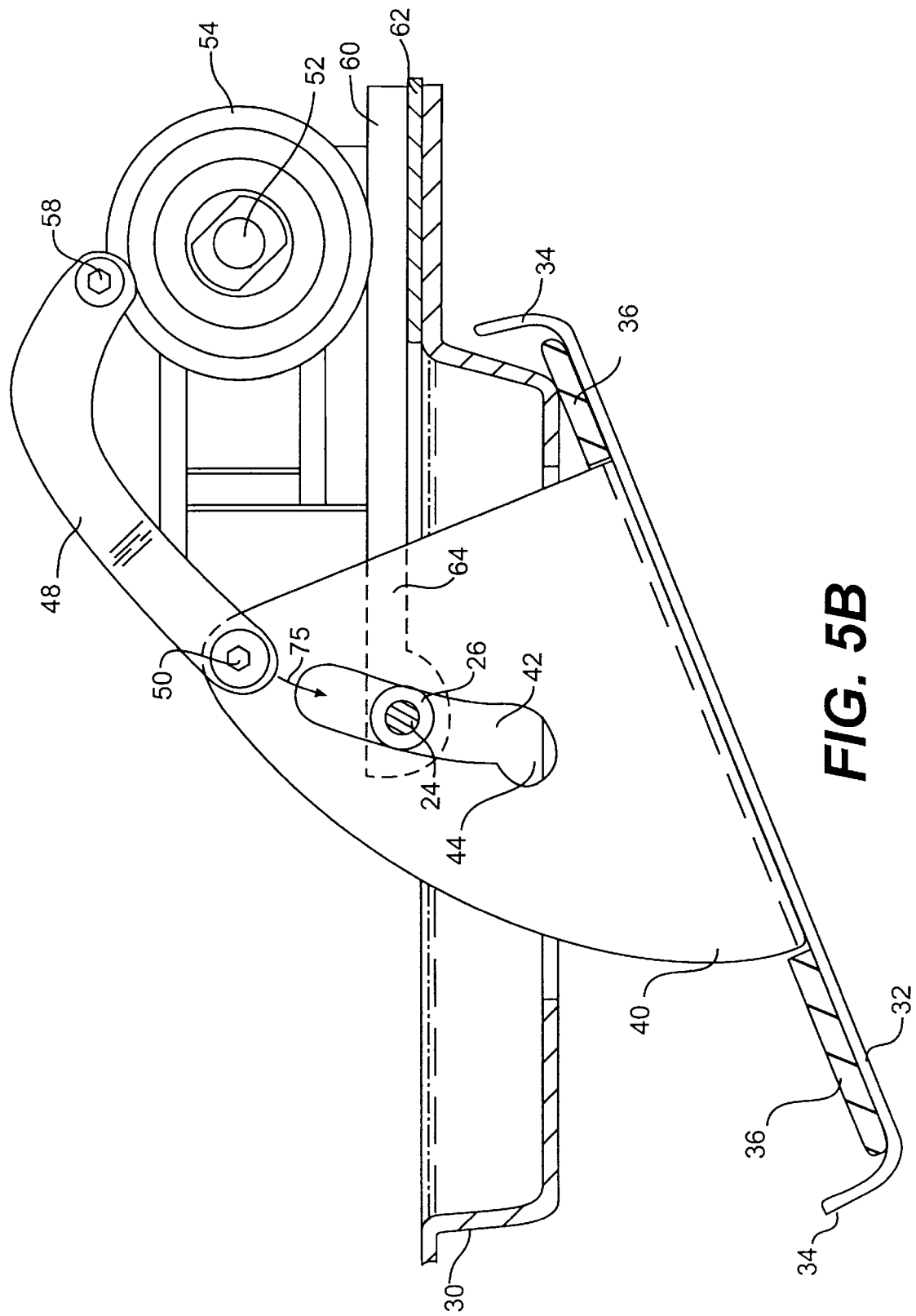
Figure 5C:
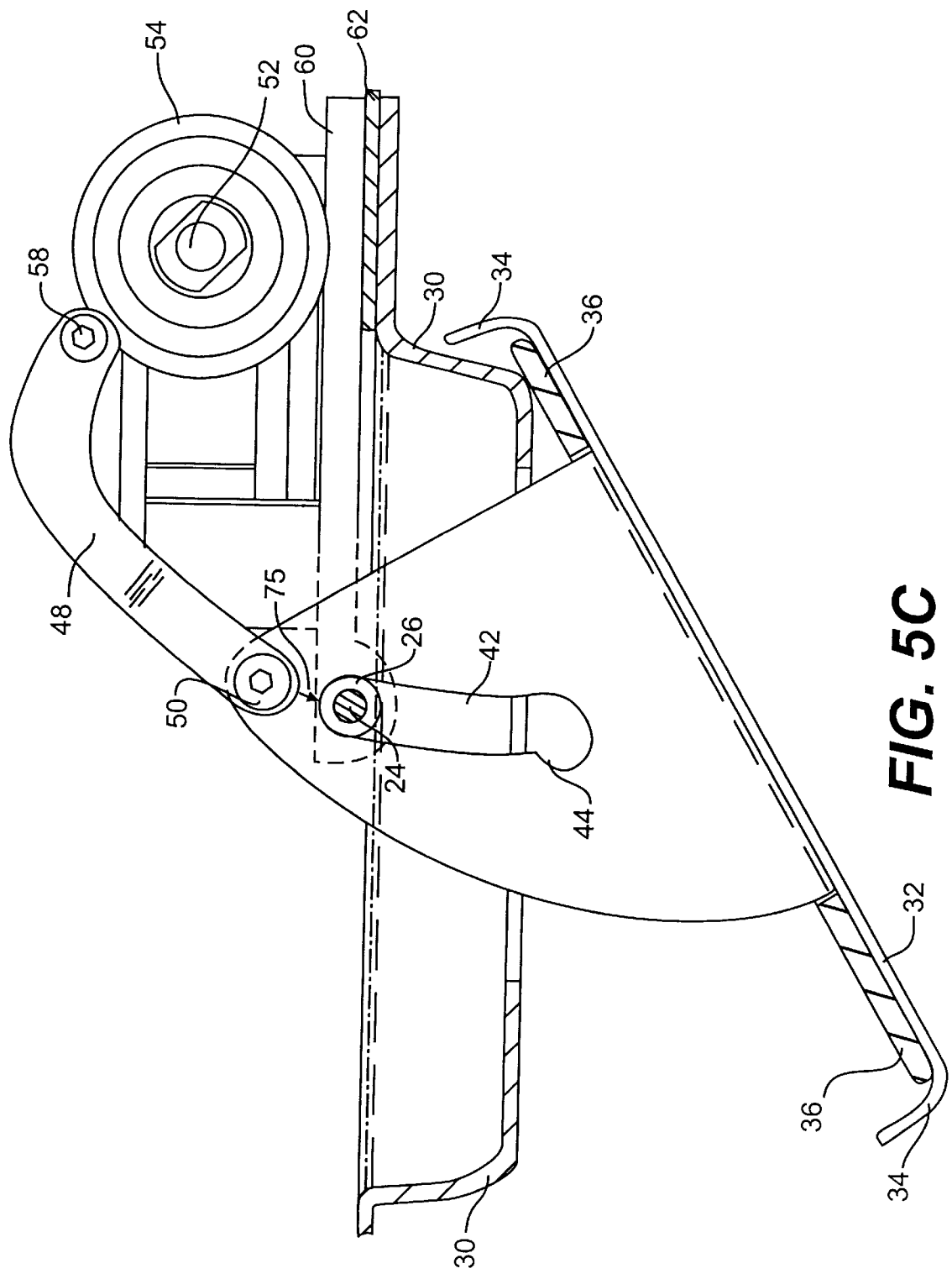

To move the cover to an open position as illustrated in FIGS. 5b and 5c, a force is applied to actuating member 40 to push the actuating member through slot 22. Guide slot 42 in the actuating member presents to roller 26 of tension rod 24 an uninterrupted concave surface or track that causes the rod 24 to bend or flex as cover 32 is opened. The resulting frictional resistance relative to movement between rod 24 and actuating member 40 suffices to hold the cover against accidental dislodgement in any position in which it is set beyond the closed position illustrated in FIG. 5a. In other words, cover 32 need not be opened to its fully open position illustrated in FIG. 5c, but may be left in a partially open position as illustrated in FIG. 5b. Not only does flexing of rod 24 hold actuating member 40 at any point along guide slot 42, but the resulting force on cover 32 is directed from its swinging axis towards the axis of the rod at an inward incline or slope. Thus, at all times an inward component holds cover 32 firmly against projecting lip 30 of frame 12.

Ventilator 10 according to the present invention also includes a motor 46 mounted directly on frame 12 to supply the pushing or pulling force to actuating member 40. Motor 46 illustrated generally in the figures as a conventional DC motor may comprise any manner of conventional motor.

Applicants have found that commercially available 12 volt DC motors are particularly suitable in the present invention and supply the necessary torque. The motor is preferably mounted to minimize its height relative to frame 12. In this regard, motor 46 may be mounted lengthwise or longitudinally on frame 12. Any suitable mounting means may be used in this regard. For example, a motor bracket 60 may be used to mount motor 46 directly to flange surface 14. Motor bracket 60 may include a flange section 62 to mount directly on flange 14 and a flange extension member 64 through which torsion rod 24 passes. This arrangement is preferred so that any torque resulting from operation of the motor is distributed to frame 12 and tension rod 24 simultaneously thereby minimizing any tendency of the motor to twist or deform frame 12.

Motor 46 includes a drive arm 48 connected to actuating member 40 at one end and operably connected to drive shaft 52 at its other end. Drive arm 48 moves in a plane perpendicular to the axis of the motor's drive shaft and converts rotational movement of the drive shaft to an elliptical or arcuate motive force for moving actuating member 40. For example, referring particularly to FIGS. 3, 5a, 5b, drive arm 48 is pivotally connected to actuating member 40 at a pivot point 50 and pivotally connected to a drive shaft casing 54 at its other end by way of a pivot point 58. Conventional pins or bolts may be utilized as the pivot points 50, 58. Shaft casing 54 is operably configured with drive shaft 52 so as to rotate therewith. It should be appreciated that the embodiment illustrated in the figures is one of any number of ways to configure the end of drive arm 48 so as to be driven by drive shaft 52.

Figure 4:
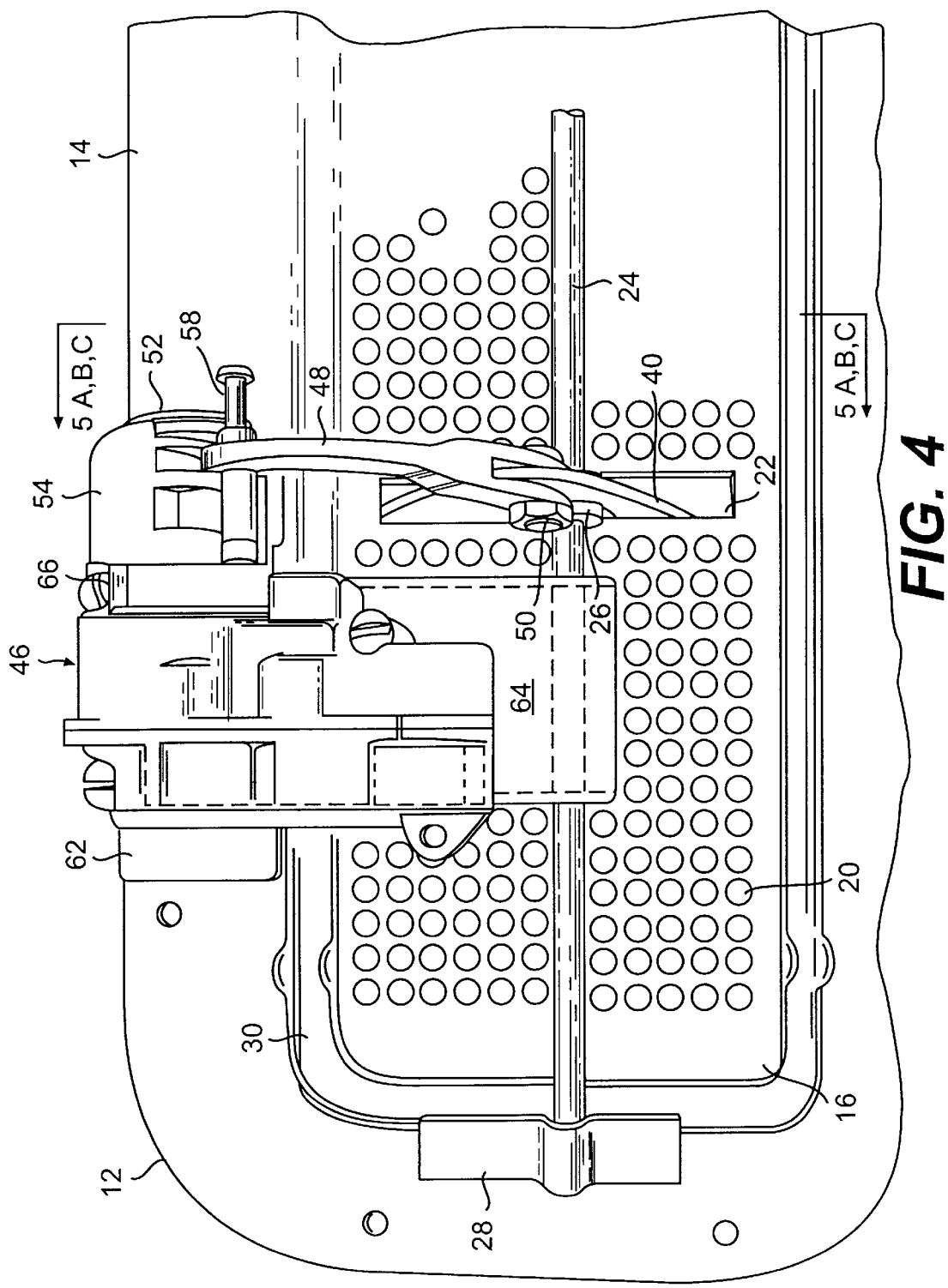
FIG. 4 is an enlarged perspective view of the motor mechanism utilized with the vent assembly.

Motor 46 may also include any manner of electrical or mechanical stops to define the rotational stroke thereof. For example, referring to FIG. 4, a mechanical stop 66 is shown as a wall or ledge against which a protrusion (not shown) of motor casing 54 contacts at the end of the motor's closing stroke. An electrical cut-off or limit switch may also be incorporated in the control circuitry or power supply to the motor 46.

Referring particularly to FIGS. 5a through 5c, drive arm 48 preferably has an overall arcuate shape that generally conforms to the elliptical guide slot 42. Pivot point 50 is disposed generally at the top end of guide slot 42 and the opposite end of drive arm 48 is attached at a remote circumferential location on shaft casing 54. In this manner, the closing and opening stroke of drive arm 48 is maximized. Drive arm 48 moves actuating member 40 in a constant opening direction as pivot point 58 moves from its relative position shown in FIG. 5a to the fully opened position shown in FIG. 5c. The same applies to the return or closing stroke of drive arm 48. In other words, if the closed position of pivot point 58 were at the 12 o'clock position on shaft casing 54 instead of at the 2 or 3 o'clock position illustrated in FIG. 5a, the opening stroke of drive arm 48 would only be from the 12 o'clock position to the 9 o'clock position in the counter clockwise direction. The strokes are maximized with the arrangement according to the figures.

The arcuate shape of drive arm 48 is also preferred in that it allows for a maximum drive stroke, as discussed above, while also directing the force of drive arm 48 essentially always towards the top of guide slot 42 along a force line that conforms generally to an extension of guide slot 42, as indicated by arrow 75 in FIGS. 5a through 5c. This arrangement maximizes efficiency of the motor torque and thus allows for a relatively smaller motor.

Motor 46 is preferably remotely controlled and powered. A power source is not illustrated in the figures and is not particularly important to an understanding of the invention. Motor 46 may be connected to any conventional power source, in a preferred embodiment wherein ventilator 10 is used in a vehicle, motor 12 is connected to the vehicles 12 volt DC system. It is also preferred that motor 46 be remotely actuated from any desired location. For example, a control switch may be provided on a dashboard of a vehicle using ventilator 10. The invention is not limited in any respect by the control station or location, or the power supply.

Figure 2:
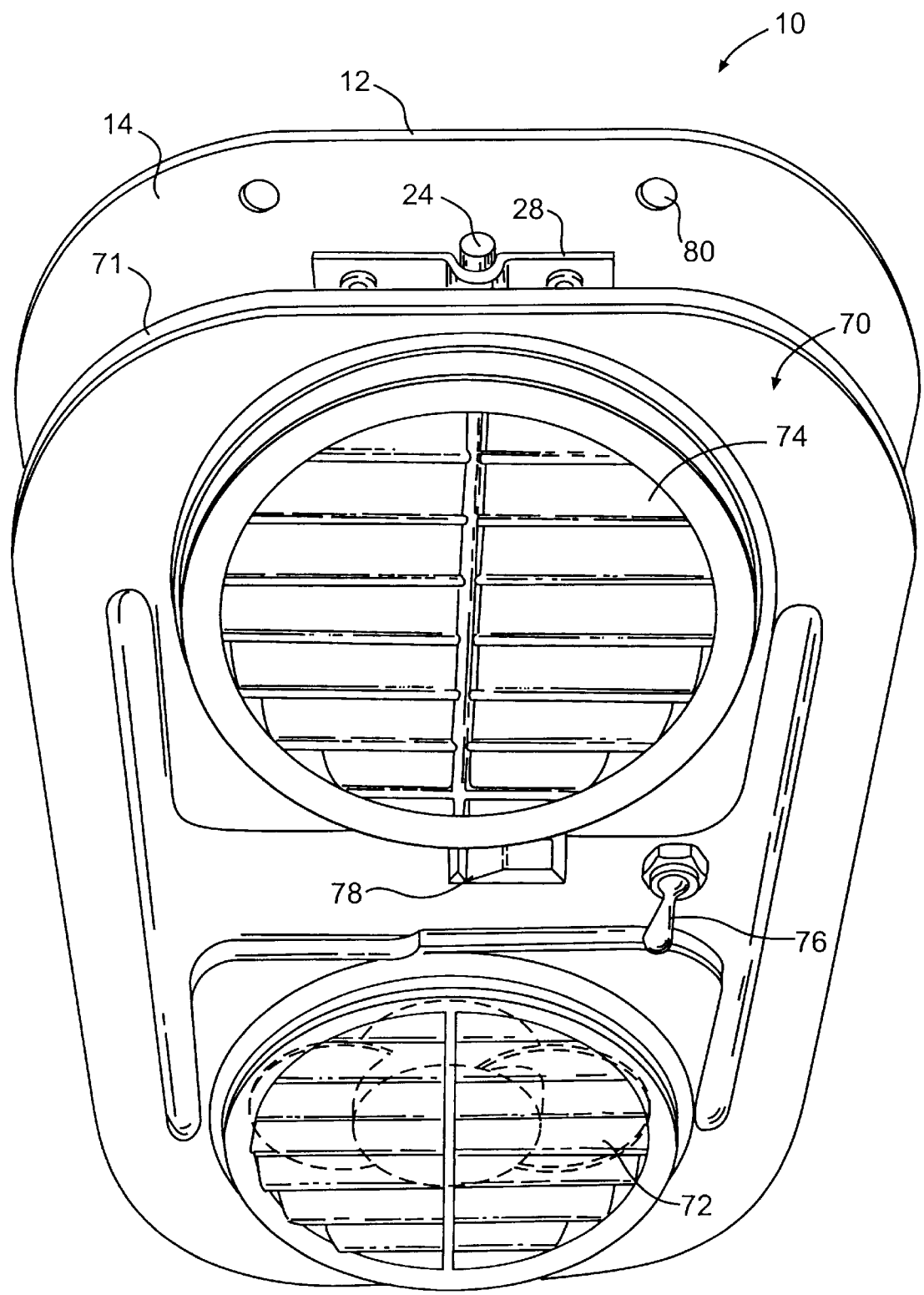
FIG. 2 is an interior perspective view of the vent assembly illustrated in FIG. 1.

In certain environments, it may be desired to provide an aesthetically pleasing or functional cover assembly to ventilator 10. One configuration of such a cover assembly 70 is illustrated in FIGS. 1 and 2. Cover assembly 70 would be placed over the interior side of ventilator 10 by any appropriate means. Cover assembly 70 includes a lip portion 71 that may be attached directly to the compartment interior wall if ventilator 10 is housed in a recess defined in the compartment wall. In an alternative embodiment, cover assembly 70 may comprise a lip portion 71 of sufficient depth to accommodate the height of motor 46. In this embodiment, cover 70 may be attached directly to frame member 12.

Cover 70 may comprise any manner or configuration of vents 74, and may also include a powered fan 72, as illustrated in FIG. 2. A switch 78 may be provided to operate fan 72 while a separate switch 76 may be provided to actuate motor 46 to move vent 10 between its open and closed position. Alternatively, remote switches may be provided as well, for example on a dashboard or other location in a vehicle. Any manner of control systems or devices may be utilized in this regard and any and all such systems are within the scope and spirit of the invention.

It should be appreciated by those skilled in the art that various modifications and variations can be made in the present invention without departing from the scope and spirit of the invention. It is intended that the present invention include such modifications and variations as come within the scope of the appended claims and their equivalents.

What is claimed is:

1. A remotely controlled powered hingeless ventilator, comprising:

a frame bounding an opening, and a plate member configured with said frame across said opening, said plate member defining air passages therethrough;

a tension rod fixed to said frame, said tension rod extending across said opening;

a cover configured on said frame on a side thereof opposite from said tension rod, said cover variably positionable between a closed position and a fully open position relative to said frame;

an actuating member connected to an underside of said cover and extending through a slot defined through said plate member, said actuating member further comprising an arcuate guide slot defined therein with said tension rod disposed through said guide slot, said actuating member and guide slot slidable relative to said tension rod as said cover is moved between said closed and open positions; and a motor mounted on said frame, said motor connectable to a power source for driving said motor, said motor further comprising a rotatable drive arm connected to said actuating member, said drive arm having a generally arcuate shape over at least a portion of its length and connected to said actuating member proximate to an end of said guide slot so that an opening and closing force is exerted by said drive arm to said actuating member along a line of force conforming generally to said arcuate guide slot.

2. The ventilator as in claim 1, wherein said drive arm is pivotally connected to said actuating member proximate said end of said guide slot.

3. The ventilator as in claim 1, wherein said motor comprises a drive shaft oriented longitudinally along said frame, said drive arm connected to said drive shaft so as to move in a plane generally perpendicular to said drive shaft.

4. The ventilator as in claim 3, wherein said drive arm is connected to said drive shaft at a circumferential location thereof so as to maximize the opening and closing stroke of said drive arm.

5. The ventilator as in claim 4, wherein said drive arm is pivotally connected to said drive shaft at circumferential side thereof opposite from said actuating member.

6. The ventilator as in claim 1, further comprising a motor bracket mounted to said frame, said motor mounted on said motor bracket.

7. The ventilator as in claim 6, wherein said motor bracket is also configured with tension rod.

8. The ventilator as in claim 1, wherein said motor comprises a DC powered reversible motor.

9. The ventilator as in claim 1, further comprising a remotely disposable motor controller configured with said motor.

10. A remotely controlled powered hingeless ventilator, comprising:

a frame bounding an opening, and a plate member configured with said frame across said opening, said plate member defining air passages therethrough;

a tension rod fixed to said frame, said tension rod extending across said opening;

a cover configured on said frame on a side thereof opposite from said tension rod, said cover variably positionable between a closed position and a fully open position relative to said frame;

an actuating member connected to an underside of said cover and extending through an opening in said plate member, said actuating member further comprising an arcuate guide slot defined therein with said tension rod disposed through said guide slot, said actuating member and guide slot slidable relative to said tension rod as said cover is moved between said closed and open positions; and a motor mounted on said frame, said motor connectable to a power source for driving said motor, said motor further comprising a drive shaft and a rotatable drive arm pivotally connected to said drive shaft so as to move in a plane generally perpendicular to said drive shaft, said drive arm pivotally connected to said actuating member to provide an opening or closing stroke thereto depending on a direction of rotation of said drive shaft.

11. The ventilator as in claim 10, wherein said drive arm has a generally arcuate shape and is connected to said actuating member so that an opening and closing force is exerted by said drive arm to said actuating member along a line of force conforming generally to said arcuate guide slot.

12. The ventilator as in claim 10, wherein said drive shaft is oriented longitudinally along said frame.

13. The ventilator as in claim 10, wherein said drive arm has a generally arcuate shape and is connected to said drive shaft at a circumferential location thereon generally opposite from said actuating member, said drive arm pivotally connected to said actuating member proximate to an end of said arcuate slot.

* * * * *